United States Patent
Drago et al.

(10) Patent No.: US 11,704,647 B2
(45) Date of Patent: Jul. 18, 2023

(54) DISPENSING AND LIVE INVENTORY MANAGEMENT SYSTEM AND METHODS THEREOF

(71) Applicant: VDMS Canada Inc., Mississauga (CA)

(72) Inventors: Patrick Drago, Mississauga (CA); Martin Keevers, Mississauga (CA)

(73) Assignee: VDMS Canada Inc., Mississauga (CA)

( * ) Notice: Subject to any disclaimer, the term of this patent is extended or adjusted under 35 U.S.C. 154(b) by 0 days.

(21) Appl. No.: 16/645,004

(22) PCT Filed: Sep. 7, 2018

(86) PCT No.: PCT/IB2018/001135
§ 371 (c)(1),
(2) Date: Mar. 6, 2020

(87) PCT Pub. No.: WO2019/048931
PCT Pub. Date: Mar. 14, 2019

(65) Prior Publication Data
US 2021/0158319 A1 May 27, 2021

Related U.S. Application Data

(60) Provisional application No. 62/555,805, filed on Sep. 8, 2017.

(51) Int. Cl.
*G06Q 20/20* (2012.01)
*G06Q 10/087* (2023.01)
*G06Q 20/26* (2012.01)

(52) U.S. Cl.
CPC ......... *G06Q 20/203* (2013.01); *G06Q 10/087* (2013.01); *G06Q 20/208* (2013.01)

(58) Field of Classification Search
CPC .. G06Q 20/203; G06Q 10/087; G06Q 20/208; G06Q 30/0601; G06Q 30/0241;
(Continued)

(56) References Cited

U.S. PATENT DOCUMENTS 5,330,062 A * 7/1994 Murphree .............. B65G 1/133
  198/793
6,131,399 A * 10/2000 Hall ..................... G06Q 10/087
  221/150 R
(Continued)

OTHER PUBLICATIONS

International Search Report dated Feb. 14, 2019, in reference to co-pending International Application No. PCT/IB2018/001135 filed Sep. 7, 2018.

*Primary Examiner* — Garcia Ade
(74) *Attorney, Agent, or Firm* — Dinsmore & Shohl LLP

(57) ABSTRACT

Dispensing and live inventory management system and methods are disclosed. A shelf for items has bins each with an associated sensor. A processor receives a detection signal from the sensor which indicates placement or removal an item(s) from an associated bin. An entry device sends an entered request for placement or removal of items to the processor, and an indicator strip has lights which uniquely identify each one of the bins when lit. The processor has information relating to which bin each subset of lights is associated, and causes activation of a subset of lights associated with a bin of the item(s) in the request and records in memory a type of action, a timestamp and a quantity of the item(s) placed or removed from the bin having the subset of lights lit and indicated in the detection signal subsequently received from the sensor of the associated bin.

20 Claims, 6 Drawing Sheets

(58) Field of Classification Search
CPC ..... G06Q 30/0643; G07F 11/62; G07F 9/026;
G07F 11/02; A47F 2010/025; A47F 1/125
USPC .......................................................... 705/28
See application file for complete search history.

(56) References Cited

U.S. PATENT DOCUMENTS

| | | | |
|---|---|---|---|
| 8,423,180 B1* | 4/2013 | Frederick | G07F 9/026 |
| | | | 700/236 |
| 8,977,390 B2* | 3/2015 | Jefferies | G06Q 20/26 |
| | | | 700/237 |
| 2003/0105552 A1 | 6/2003 | Lunak et al. | |
| 2003/0109956 A1 | 6/2003 | Spano, Jr. et al. | |
| 2008/0183327 A1* | 7/2008 | Danelski | B65G 1/1376 |
| | | | 700/216 |
| 2010/0176699 A1 | 7/2010 | Biba et al. | |
| 2012/0203376 A1 | 8/2012 | Savage et al. | |
| 2014/0091684 A1 | 4/2014 | Fitzgerald et al. | |
| 2017/0228816 A1 | 8/2017 | Joppi et al. | |

\* cited by examiner

DISPENSING AND LIVE INVENTORY MANAGEMENT SYSTEM AND METHODS THEREOF

CROSS REFERENCE TO RELATED APPLICATION

This application claims benefit to U.S. Provisional Application 62/555,805 filed Sep. 8, 2017, which is incorporated by reference in its entirety.

TECHNICAL FIELD

The present disclosure relates generally to the field of item dispensing, and particularly to the dispensing of items from a location, such as within a convenience store, in which a system visually guides a store clerk to a specific bin which holds a purchased item both on an electronic display and at the bin and manages via a live inventory the items held by the bin.

BACKGROUND

Tobacco markets worldwide are increasingly going "dark", i.e. laws in certain local and national jurisdictions no longer permit highly distinguishable marks on the physical packaging of tobacco goods beyond a plain representation of the product name presented on a flat base color along with a required health warning. In some jurisdictions, one solution to comply with such laws has involved concealing from public view all tobacco products which carry distinguishable marks on their physical packaging.

In order to conceal tobacco from the public's view, shop owners have implemented various solutions such as, e.g., using opaque sliding doors and/or hidden draws. However, such solutions are mostly viewed only as short term as such were not designed typically with any reliable security features or made robust enough to endure a high opening and closing frequency that is often required with such products. In addition, such solutions often do not take into account the difficulty caused to the shop clerk in dispensing, inventorying and stocking such products.

SUMMARY

It is against the above background that a dispensing and live inventory management (DLIM) system and methods thereof are disclosed herein. Although useful in a wide variety of applications, the DLIM system will find its greatest use in dispensing indistinguishable items, such as "dark" tobacco products, within a convenience store environment.

In one exemplary embodiment, the DLIM system comprises a lighting system which guides a store clerk to a specific bin which holds a purchased item and includes a live inventory management application of items held by the bin.

In another embodiment, the DLIM system described herein provides a shelf having a plurality of dividers which divide the shelf into a plurality of bins for holding visibly indistinguishable items. A sensor may be associated with each one of the plurality of bins to detect placement or removal of one or more of the items from the associated bin. A processor, having a memory which stores a list of items which are held within each of the bins, may be in communication with the sensor to receive a detection signal which indicates the placement or removal of the one or more of the items from the associated bin. An entry device in communication with the processor sends entered requests for item placement or removal to the processor. An indicator strip is attached to the shelf, e.g., along the entire front edge of the shelf, wherein the indicator strip has a set of lights linearly arranged in an single dimension such that an associated subset of the set of lights comprising two or more lights uniquely identifies an associated one of the bins when lit, wherein the strip is in communication with the processor and wherein the processor further includes information relating to which bin each subset of the set of lights of the strip is associated. Selection of one of the items from the list of items via the entry device causes the processor to send a signal to actuate the subset of the set of the plurality of lights which is associated with the bin with the selected item, and to record in memory a timestamp and quantity of the one or more of items placed or removed from the associated bin having the subset of the set of lights light and indicated in the detection signal subsequently received from the sensor of the associated bin.

In still another embodiment, a method for dispensing items from a dispensing and live inventory management system is disclosed. The system comprises a shelf having a plurality of dividers which divide the shelf into a plurality of bins for holding visibly indistinguishable items, a sensor associated with each one of the plurality of bins to detect placement or removal of one or more of the items from the associated bin, a processor having a memory which stores a list of items which are held within each of the bins and being in communication with the sensor to receive a detection signal which indicates the placement or removal of one or more items from the associated bin, an entry device in communication with the processor which sends entered requests for placement or removal of the one or more items to the processor, and an indicator strip attached to the shelf, wherein the indicator strip has a set of lights linearly arranged in an single dimension such that an associated subset of the set of lights comprising two or more lights uniquely identifies one of the bins when lit, wherein the strip is in communication with the processor and wherein the processor further includes information relating to which bin each subset of the set of lights of the strip is associated, and wherein selection of at least one of the items from the list of items via the entry device causes the processor to send a signal to actuate the subset of the set of the plurality of lights which is associated with the bin with the one or more items selected, and to record in memory a type of action being selected from a placement and a removal, a timestamp and a quantity of the one or more items selected placed or removed from the associated bin having the subset of the set of lights light and indicated in the detection signal subsequently received from the sensor of the associated bin. The method comprises storing in memory of the system: a list of items which are held within each of the bins, and information relating to which bin each subset of the set of lights of the strip is associated with each item; receiving via the processor entered requests for placement or removal of one or more selected items sent from the entry device to the processor; sending via the processor a signal to actuate the subset of the set of the plurality of lights which is associated with the bin with the one or more selected items; and recording in memory the type of action selected from a placement and a removal, the timestamp and the quantity of the one or more selected items placed or removed from the associated bin having the subset of the set of lights light and indicated in a detection signal subsequently received from the sensor of the associated bin.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used herein, the follow terms mentioned hereinafter refer to or have the following meaning.

The term "Application Programming Interface (API)" refers to a programming bridge between various internal software and hardware applications that allows for easy connectivity to other third party applications.

The term "Bright Markets" is tobacco industry nomenclature indicating regional jurisdictions where branded tobacco packaging is permitted (Bright).

The term "Dark Markets" is tobacco industry nomenclature indicating regional jurisdictions where branded tobacco packaging is prohibited (Dark).

The term "Light Emitting Diode (LED)" is an electronic component that emits light if current is applied in a particular direction through it.

The term "Process Logic Controller (PLC)" refers to a programmable microprocessor based controller that manages control of a hardware apparatus, and which is typically used to translate analogue or digital signals and provide electronic transport in industry standard computing, communication and networking formats.

The term "Point-Of-Sale (POS) device" refers to a retail cash register, e.g. a retail-adapted personal computer with sophisticated accounting, dispensing and cash management software running thereon.

The term "Pusher" refers to a spring loaded packaging arrangement that always ensures that product stacked inside it is "pushed" to the front of the arrangement.

The term "Pulse Width Modulation (PWM)" refers to a technique by which various similar components (such as arrays of LEDs) can identify themselves sequentially in an electrical array by encoding a short unique ID in a pulsing signal.

The term "Rheostat" refers to a variable resistor (also known as a potentiometer), e.g., a carbon strip and sensor arrangement, in which a change in resistance across the Rheostat is dependent on the relative position between contacts of the sensor on the strip, thereby allowing the distance between the sensor contacts to be measured electronically, e.g., by a PLC.

The term "Shrinkage" is a retail industry description of stock that is unaccounted for, e.g., stolen, destroyed, misplaced, etc., and typically caused by staff at various stages in the supply chain.

An "interstitial" refers to a software application's window displayed before or after an expected content window, and is presented on a display screen for a predetermined amount of time before closing either automatically or via manual user interaction before expiration of the predetermined amount of time.

A "modal window" refers to a graphical control element subordinate to a software application's main window. It creates a mode that disables the main window, but keeps it visible with the modal window as a child window in front of it. Users must interact with the modal window before they can return to the main (parent) window of the software application.

Figure 1:
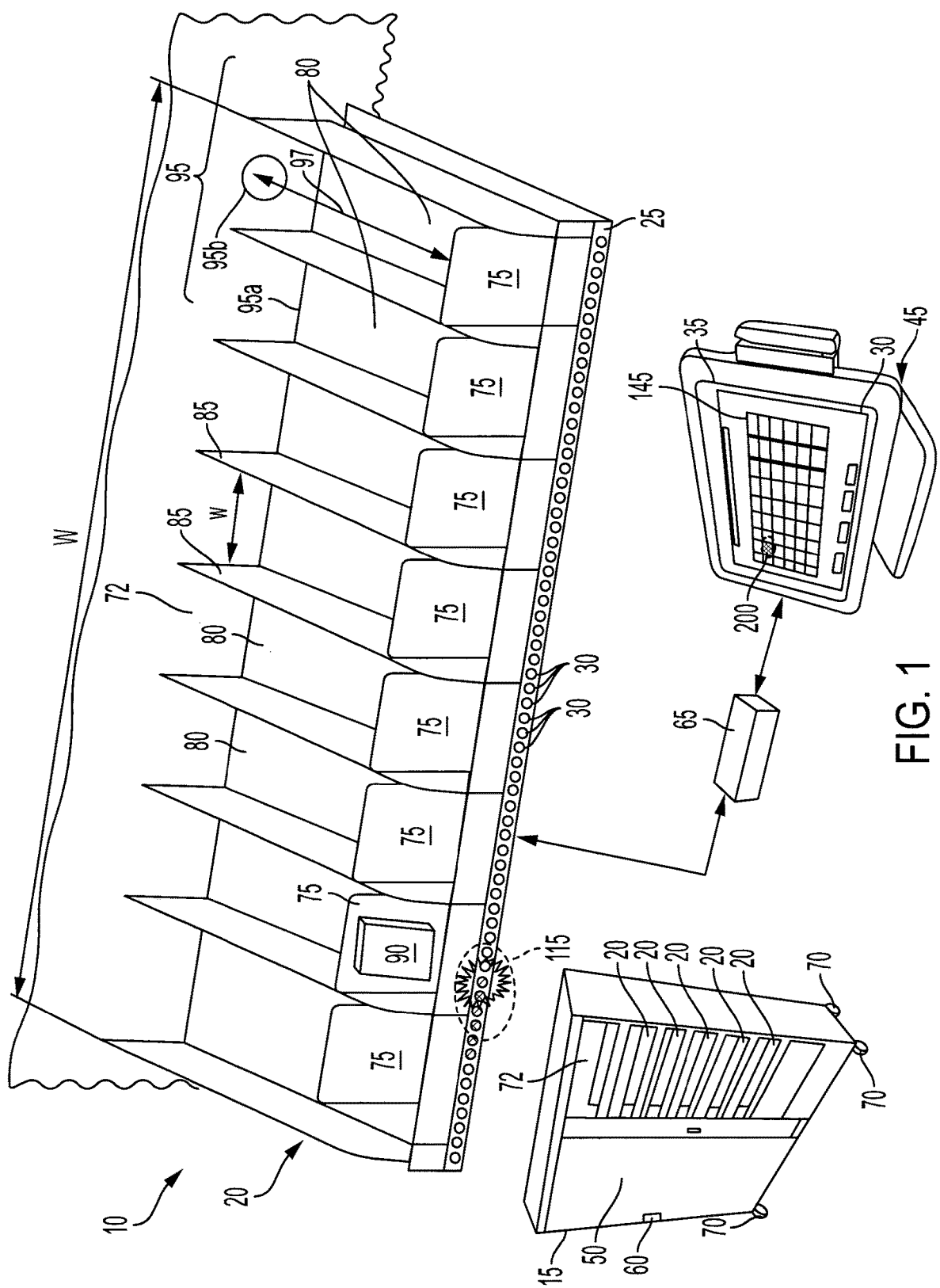
FIG. 1 is a depiction which illustrates a high level representation a dispensing and live inventory management (DLIM) system according to an exemplary embodiment, with an expanded view of an included shelf from a cabinet.

With reference to FIG. 1, a high level representation of a dispensing and live inventory management (DLIM) system 10 according to an exemplary embodiment is depicted. The DLIM system 10 primarily facilitates the dispensing and sales of various tobacco products, as tobacco markets increasingly go dark. It is to be appreciated that there is a trend afoot in an effort to curb the use of tobacco products in which local and national laws in certain regions no longer permit highly distinguishable marks on the physical packaging of tobacco goods beyond a plain representation of the product name, presented on a flat base color along with a provided health warning.

Such laws, however, are resulting in highly stressful "switchover" scenarios, whereby previously easily identifiable tobacco products are virtually indistinguishable from each other, right down to uniformity even in the size of the packaging. This lack of individuality across multitudes of different products carried at a sales location (often 90+) is a challenging daily scenario for both retail staff and various other participants in the supply and procurement chain of tobacco products. In view of such, the DLIM system 10 provides a means in which to quickly identify the position of such indistinguishable products in a gantry arrangement or cabinet 15 of one or more shelves 20 by means of a highly visible, illumination indicator strip 25 providing a plurality of lights 30 and/or a screen interaction/graphical user interface (GUI) 35 provided on a display 40, e.g., of a POS device 45. The DLIM system 10 also provides real-time management of stock and accounting of the various dispenses and replenishments occurring during the day to the different products, thus making a highly tedious process of physically counting near-identical looking products at the end of a shift or accounting period virtually redundant.

As depicted in FIG. 1, in one exemplary embodiment, the cabinet 15 provides a sales location, such as within a convenience store, gas station, grocery store, liquor store, etc., from which to hold and dispense various dark items. The cabinet 15 in one embodiment has one or more doors 50 to enclose within an enclosure 55 of the cabinet 15 a plurality of retractable and/or fixed shelves 20. Although the illustrated embodiment of FIG. 1 is shown with two doors and six shelves, the number of doors and shelves may be varied as desired. For example, the cabinet 15 may include one to twenty doors, and two to thirty shelves in any row and/or column fashion, e.g., a single stack of shelves (one over the other) or two or more columns of such stacked shelves arranged side by side. In another embodiment, an overhead/gantry arrangement of one or more shelves 20 that are hidden from public view may be provided in addition to or instead of cabinet 15. In certain embodiments, the cabinet 15 and/or each shelf 20 may have a lock 60 to prevent access to the cabinet and/or shelf when locked e.g., preventing a retractable shelf from retracting from the cabinet and/or opening a protective cover (not shown) to the shelf. In still another embodiment, the lock 60 stays locked until receiving a signal from a controller 65 of the DLIM system 10 to unlock and likewise can be locked either manually or automatically via another signal from the controller. Such remotely operated locks are disclosed by U.S. Pat. Nos. 6,297,725, 7,728,711 and 8,996,164, the disclosures of which are herein incorporated fully by reference.

As depicted in FIG. 1, the cabinet 15 may rest upon a plurality of wheels 70, be free-standing, or wall-mounted as desired. The cabinet 15 may also be fashioned with various dimensions. For example, the cabinet 15 may have a size from about 12 to 300 inches wide, 0.5 to 8 feet high, and 3 to 60 inches deep from the door 40 to a back wall 72 thereof.

As also depicted by FIG. 1, in the expanded view depicting a representative one of the shelves 20, each shelf has one or more pushers 75 associated with a plurality of bins 80. A plurality of transverse dividers 85 divide the shelf 20 into the plurality of bins 80. Each bin 80 is used to hold visibly indistinguishable items 90, e.g., like tobacco products in dark markets. Although bins 80 are depicted in FIG. 1 as being evenly spaced/sized along (and transverse to) a major width W of shelf 20, the dividers 85 can be adjustable and/or removable in order to adjust a minor width w of each bin as well as the number of bins provided per shelve. For example, one shelf 20 may have fewer or more bins 80 then the other bins in order are to accommodate items 90 that are of different shapes and/or sizes like, e.g., cigarette cartons, cigars, cigar boxes, chewing leaf pouches, snuff boxes, loose leaf (pipe) tobacco jars, and the like. To be retractable, each shelf 20 may comprise a conventional frame/retractable shelf mechanism (not shown) having an associated track(s) which allows the shelf to be slid in and out of cabinet 15 (FIG. 1). As each shelf 20 may have more or fewer bins 80 in order are to accommodate items of different shapes and sizes, one or more of the pushers 75 may be associated with each bin 80. For example, in a shelf 20 containing cigarette cartons, two or more pushers 75 may be used in an oversized one of the bins 80 that is formed by removing/bringing together one or more adjacent dividers 85. In other embodiments, each of the pushers 75 may be removable to provide fewer or only one pusher 75 in such an oversized bin, e.g., if movement of the item is better facilitated thereby.

Figure 2:
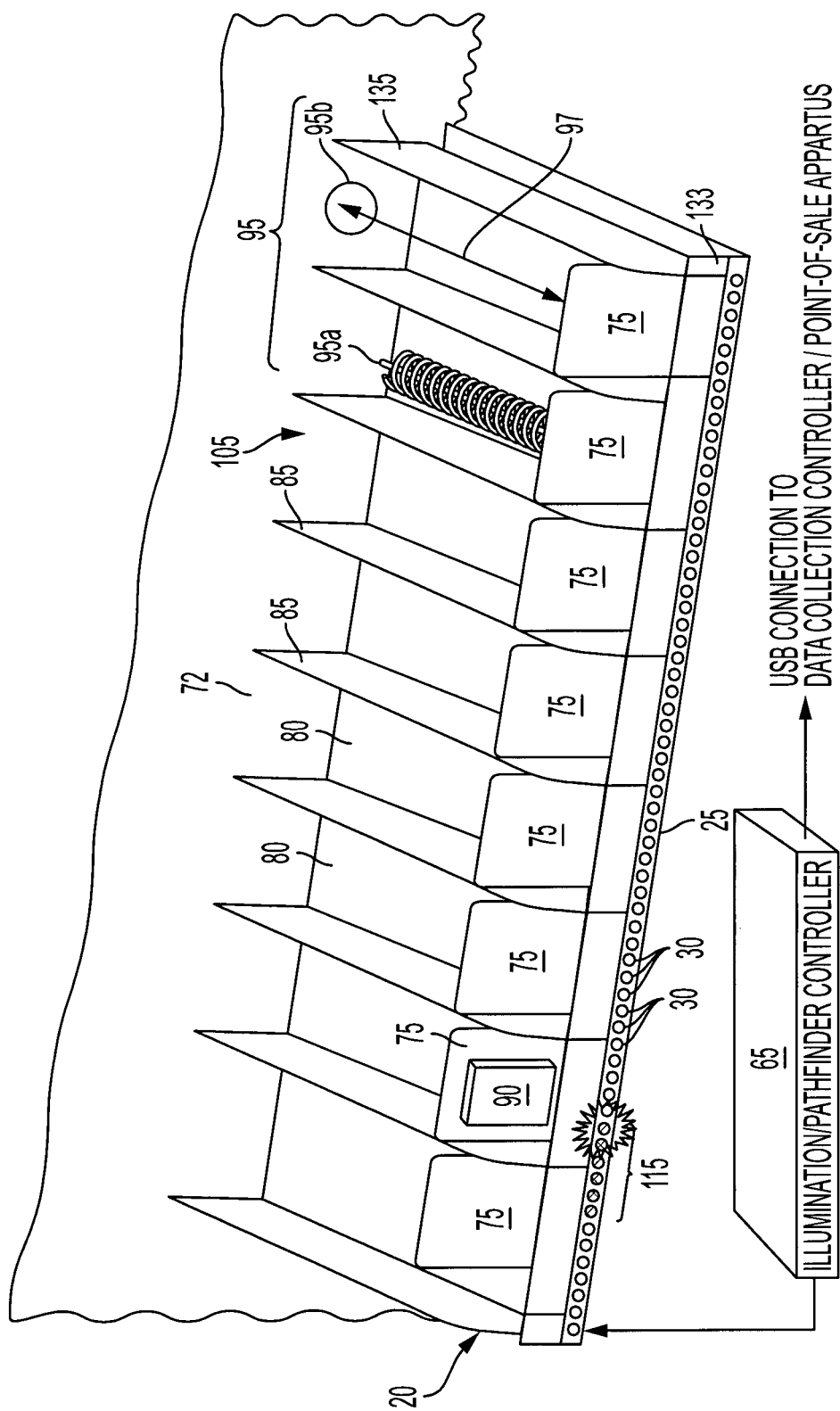
FIG. 2 is a depiction that shows details of various components of the DLIM system of FIG. 1 according to an exemplary embodiment.

Referring to FIG. 2, a sensor 95 is associated with each one of the plurality of bins 80 to detect placement or removal of one or more of the items 90 from the associated bin 80, and send a detection signal to controller 65. For example, in one illustrated embodiment, sensor 95 may be of the type that detects each incidence of the selected item picked or placed from the associated bin 80 via a change in electrical resistance of a spring-loaded sensor 95a, such as associated with each pusher 75, that travels on a carbon rheostat track situated below or next to each bin of the shelf. An example of a sensor and pusher arrangement is disclosed by U.S. Patent Appln. Pub. No. 2005/0279722, the disclosure of which is herein incorporated fully by reference. In another embodiment, sensor 95 may be of the type that detects each incidence of the selected item picked or placed from the associated bin via a difference of measurement/time-of-flight in a transmission and detection of a beam of light 97 from a micro-laser and collector sensor 95b situated adjacent a back side of each bin 80, such as on back wall 72, to and reflecting back from the rear of the pusher 75. An example of a time of flight sensor and pusher arrangement is disclosed by U.S. Patent Appln. Pub. No. 2005/0279722, the disclosure of which is herein incorporated fully by reference.

Figure 3:
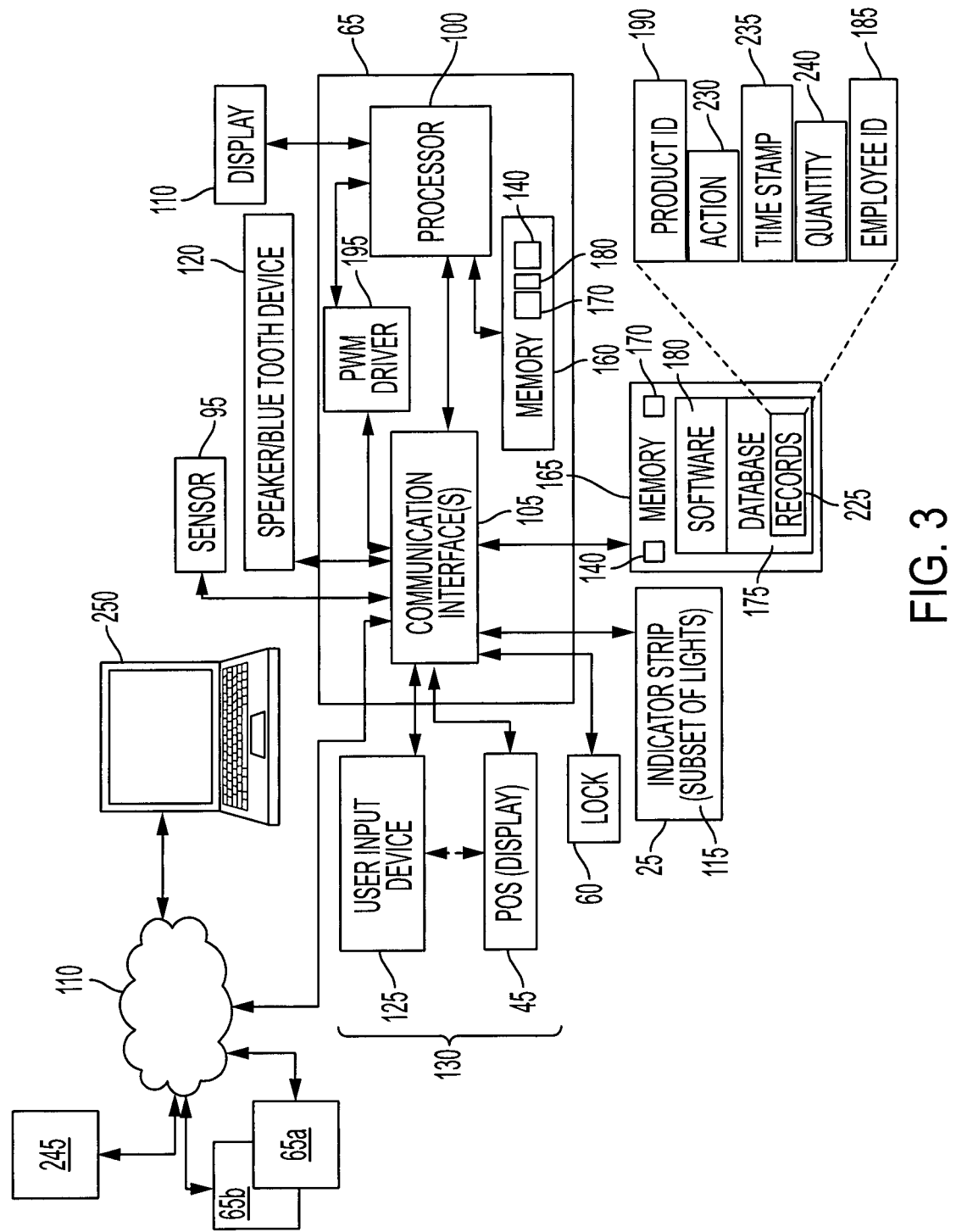
FIG. 3 is a schematic block diagram of a process logic controller and other various components of the DLIM system of FIG. 1 according to an exemplary embodiment.

With reference made also to FIG. 3, the controller 65 has a processor 100. The processor 100 can be any device capable of executing machine readable instructions. Accordingly, the processor 100 may be an integrated circuit, a microchip, a computer, or any other computing device. As such, it is to be appreciated that controller 65 in one embodiment may be a standalone device and in other embodiments may comprise, include or be embodied in one or more processing elements which provides a processor, such as one or more of a laptop computer, desktop computer, workstation computer, server computer or the like.

The processor 100 is connected to at least one interface or other means for displaying, transmitting and/or receiving data, content or the like. In this regard, the interface(s) may include at least one communication interface 105 or other means for transmitting and/or receiving data, content or the like, such as to and/or from other devices (e.g., workstation computers) and/or networks 110 coupled to the processor 100 and/or POS device 45. In this regard, the processor 100 may be coupled to one or more networks 110, including one or more wireline and/or wireless local area networks (LANs), wide area networks (WANs) (e.g., the Internet) or the like. In other embodiments, the communication interface 105 can include a communication transceiver for sending and/or receiving data according to any wireless communication standard. For example, the communication interface 105 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

In the illustrated embodiment of FIG. 3, the processor 100 of the controller 65 is in communication with each sensor 95, such as one or more sensors 95a and/or 95b (FIG. 2), via the communication interface 105. The processor 100 receives the detection signal from the sensor 95 which indicates the placement or removal of one or more of the items 90 from an associated bin 80. The processor 100 also controls, via sending a signal through the communication interface 105, the selective activation of a subset of lights 115 (of the plurality of lights 30) provided along the indicator strip 25 to help guide a store clerk to a specific bin 80 of a specific shelf 20 which holds a purchased item 90 as also depicted by FIGS. 1 and 2.

In addition to the communication interface 105, other interface(s) in communication with the processor 100 may also include a display 110, one or more wired and/or wireless (e.g., Bluetooth, Infrared, etc.) earphones and/or speakers 120 and at least one entry device 130 that may include, for example, a display 30 of POS device 45 and/or a user input device 125. The user input device 125, in turn, may comprise any of a number of wireline and/or wireless devices allowing the controller 65 to receive data from a user, such as a microphone, an image or video capture device, a keyboard or keypad, a joystick, the above-mentioned entry device(s), a magnetic or barcode reader, and/or any other conventional input device. The processor may also include other user interlaces such as a remote computer 250.

As best shown in FIG. 2, the indicator strip 25 is attached to the shelf 20 at a front end 133. By "front end" is meant a side that is opposed to a "back end" 135 of the shelf 20 from which the pusher 75 travels (biased towards) to the front end 133 when items 90 are picked from the associated bin 80. As also depicted, the set of lights 30 of the indicator strip 25 are linearly arranged in a single dimension, e.g., the dimension defined by major width W (FIG. 1), such that the subset of lights 115, comprising two or more lights, uniquely identifies an associated one of the bins 80 when lit/activated by the processor 100. In one embodiment the lights 30 are LEDs. In other embodiments, the lights may be incandescent or florescent bulbs, quantum dots, lasers, and/or photonic crystal light sources.

Referring back to FIG. 3, the indicator strip 25 is in communication/controlled by the processor 100 of the controller 65, wherein the processor 100 includes data/information 140 relating to which bin 80 each subset of lights 115 is associated. In one embodiment, the information 140 relating to which bin 80 each subset of lights 115 is associated is set by entering e.g., a positional numbering of each light located in the strip for the subset of the set of lights. In another embodiment, as shown by FIG. 1, the graphical user interface (GUI) 35 provides a virtual storage arrangement 145 for each shelf 20 at a storage location, such as in cabinet 15 on a display 30, 110 within the DLIM 10.

Figure 4:
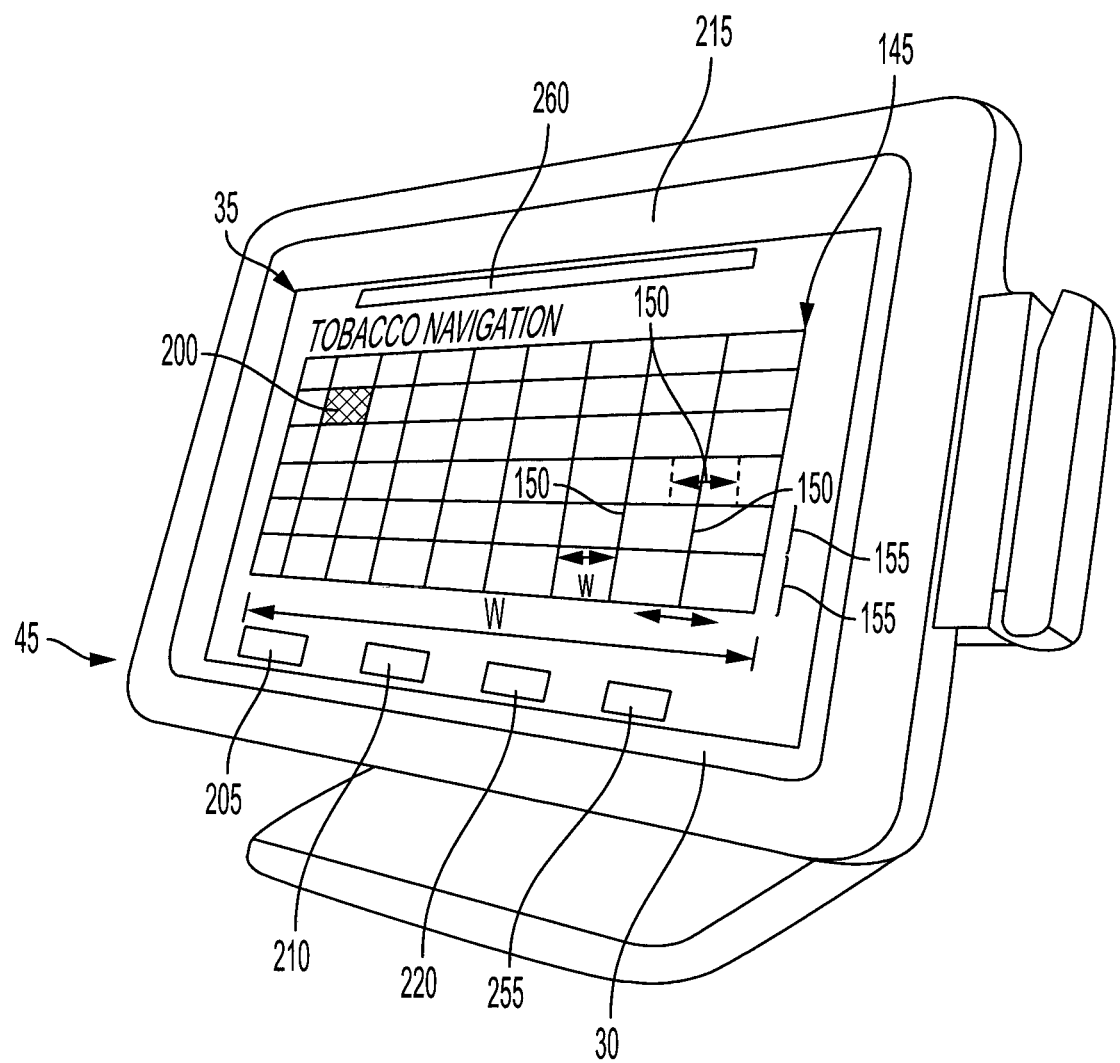
FIG. 4 is a depiction that shows expanded details of other various components of the DLIM system of FIG. 1 according to an exemplary embodiment.

As best depicted by FIG. 4, the virtual storage arrangement 145 provided by the GUI 35 on display 30 of the POS device 45 mimics virtually the physical storage arrangement provided in cabinet 15, i.e. a vertical stacking of six shelves 20 with each shelf having a total of nine bins 80. When in a set-up mode for the GUI 35, the information 140 relating to which bin 80 each subset of lights 115 is associated can be set and entered by movement and placement of an electronically depicted divider 150 for an associated electronically depicted shelf 155 in order for the divider position to directly correspond to the associated bin 80 of the actual/physical shelf 20. The number of electronically depicted dividers 150 and selves 155 may be conveniently adjusted via adding or deleting such electronic depictions from the GUI 35 in order to match the number of actual shelves 20 and dividers 85 defining each bin 80 that is provided at a storage location, such as e.g., in cabinet 15. The width of each graphically depicted shelf 155 may be conveniently adjusted by entering into the application the corresponding physical major width W of each actual shelf 20. It is to be appreciated that in the exemplary embodiments shown by FIGS. 1 and 4, although the number and of shelves 20 and bins 80, and major and minor widths W, w thereof, are all depicted as being equal, each shelf 155 may have a different number of bins as well as major and minor widths W, w, via removing or adding dividers 150 in order to match the physical storage arrangement provided at a physical storage location with the virtual storage arrangement 145.

With reference made again to FIG. 3, the controller 65 has or is in communication with one or more memories 160, 165, which each may store the information 140 regarding the subset of lights 115 and associated bins 80 as well as an item list 170 listing all of the items 90 that are held within each of the bins 80. Each memory 160, 165 can comprise volatile and/or non-volatile memory, and typically stores content, data or the like, such as in one or more databases 175. In this regard, each memory 160,165 may store content transmitted from, and/or received by, the processor 100, and be either internally provided with the controller 65 as is memory 160 and/or external to the controller 65 as is memory 165. Each memory 160, 165 may also store one or more software application 180 for the processor 100 to perform steps associated with operation of the DLIM 10 in accordance with the exemplary embodiments of the present invention disclosed herein (although any one or more of these steps may be implemented in any combination software, firmware or hardware).

The user input device 125, being in communication with the processor 100, is one form of entry device 130 that sends entered requests for the placement or removal of the one or more items to the processor. In some embodiments, the user input device 125 may comprise a keyboard for entering information into the processor 100 for processing and/or storing in memory 160, 165. For example, the user input device 125 may be employed to enter employee identification information 142, requests for item placement and/or removal, and the like into the processor 100. In other embodiments, the user input device 125 allows the clerk to scroll through the item list 170, such as provided via display 30, 110, in order to make a selection from the one or more items 90. In still other embodiments, the user input device 125 may comprise a magnetic or bar code reader. A code reader allows a clerk to be conveniently identified by swiping an appropriate ID card through reader to provide an employee identification information 185 as well as to read a product identification 190 associated with each item 90 contained in the item list 170 in order to select the one or more items 90.

Selection of at least one of the items 90 via the user input device 125 causes the processor 100 to send a signal, such as a PWM signal from a PWM driver 195 of the controller 65, to actuate the subset of lights 115 associated with the bin 80 holding the one or more items 90 selected. Subsequently to the receipt of the entered requests, if so configured, an unlock signal is sent to the associated lock 60 also by the processor 100. An arrangement of an indicator strip 25 having a subset of lights 115 controlled via a PWM signal from PWM driver 195 is disclosed by U.S. Pat. No. 8,939, 604, the disclosure of which is herein fully incorporated by reference.

Referring back to FIGS. 1 and 4, after a selection of the one or more items 90 via the user input device 125, the processor 100, in addition to illuminating automatically the corresponding subset of lights 115, will also electronically indicate automatically the corresponding position of the associated bin 80 containing the one or more items 90 selected within the virtual storage arrangement 122 of the GUI 35. As best depicted by FIG. 4, the corresponding position of the associated bin 80 is indicated electronically on e.g., display 30, via a visible indicator 200, such as an image, icon, differentiating graphic, color change, etc., which highlights virtually the associated physical position of the one or more selected items 90 contained in the associated shelf 20 of the cabinet 15.

It is to be appreciated that although the display 30 in FIGS. 1 and 4 is depicted as a component of the POS device 45, any display device, such as display 110 (FIG. 3) or that provided by a touch screen display, a laptop, a smart phone, tablet, etc., such as remote computer 250, and in communications, wired or wirelessly, with the processor 100 may be used to provide the virtual storage arrangement 122 of the GUI 35 actively displayed with the visible indicator 200. It is further to be appreciated that the virtual storage arrangement 122 actively displayed with the visible indicator 200 (which can be shown also as a constant image, flashing image, spinning image, shaking image, and the likes) helps guide a clerk to the physical location of the one or more items 90 selected. Accordingly, it is to be further appreciated that in an embodiment, the user input device 125 can be a touch screen display and after electronic selection of the one or more items 90 via the touch screen display, the processor 100 activates the subset of lights 115 and displays the virtual storage arrangement 122 of the GUI 35 on the touch screen display with the visible indicator 135. In other embodiment, the entry device 130 is the POS device 45 and after electronic selection of the one or more items 90 via the POS device 45 and/or user interface device 125, the processor 100 activates the subset of lights 115 and displays the virtual storage arrangement 122 of the GUI 35 on the display 30 of the POS 45 with the visible indicator 135. In still another embodiment, the entry device 130 is the user input device 120 that is in communications with the point-of-sale (POS) device 45 and/or the processor 100, and after electronic selection of the one or more items 90 via the user input device, the processor 100 activates the subset of lights 115 and displays the virtual storage arrangement 122 of the GUI 35 with the visible indicator 135 on display 110.

In still another embodiment, after electronic selection of the one or more items 90, branding information 205 (FIG. 4) of the one or more items 90 can be displayed by the processor 100 on display 30, 110. For example, the branding information 205 of the one or more items 90 is a brand of tobacco. In still another embodiment, the processor 100 can display alternative information 210 of various products if the one or more items 90 selected are out of stock or the other various products are specifically marked for a promotion. In yet other embodiment, the processor 100 provides the GUI 35 as an interstitial or modal window via an Application Programming Interface (API) to a remote application 215. As depicted by FIG. 4, the GUI 35, when provided as an interstitial or modal window, overlays/pop-ups/sits on top of the graphical interface of the remote application 215 running, e.g., on the POS device 45. In still other embodiments, the processor 100 provides dispensing and replenishment balances 220 of the items 90 held by bins 80 of each shelf 20 in the cabinet 15 in response to queries received via the API from the remote application 215. In one embodiment, the remote application 215 is a conventional point-of-sale application, and in other embodiments it may be any suitable accounting, inventory management, ecommerce, and/or sales software application.

It is to be appreciated that in order to provide the GUI 35 on a display of a third party POS device 45 such integration is dependent on the capabilities of the host POS system. Some POS systems provide APIs in the form of one or more of the following: dynamically-linked libraries (DLL), Microsoft .NET assemblies, Component Object Model (COM) DLLs, XML interfaces, web services. SOAP or other service-oriented architectures (SOA), SQL databases, and so on. Some implementations may employ several of these methods at once, for example, when retrieving inventory data from a SQL database, while submitting credit card payment requests through an API or a XML request. According to the various embodiments of the present invention, the ability to provide the GUI 35 as an interstitial or modal window as illustrated in FIG. 4, via an available API, allows the information of the DLIM system 10 to be displayed on multiple POS systems, while leaving the underlining POS framework/software unchanged.

Referring back to FIG. 3, upon the processor 100 subsequently receiving a detection signal from a sensor 95 of an associated bin 80 (with its subset of lights 115 lit/activated by the processor) of a quantity of items 90 placed or removed therefrom, the processor 100 records in memory 160 and/or 165 such in an event record 225. In particular, the processor 100 records automatically in the event record 225: the product identification 190 related to the one or more items 90 selected, a type of action 230 that is took place for each related item 90 selected, either a placement or a removal, a timestamp 235 of the date and time of the action, and/or a quantity 240 of the related items 90 detected by the sensor 95 as being placed or removed from the associated bin 80 having the subset of lights 115 lit and indicated in the detection signal. Optionally, the employee identification 185 performing the action 136 may also be included in the event record 132 if entry is requested by the processor 100 in order to accept the request for an item 90. In the above processing, should the processor 100 receive a detection signal from a sensor 95 that is not associated with the bin 80 of the one or more selected items 90 with the lit subset of lights 115, the processor 100 will then provide an error condition which will cause an alert that the one or more selected items 90 is being placed or removed to/from an incorrect bin 80. The error condition will continue until the sensor 95 of the incorrect bin 80 provides a detection signal of the placement or removal of the incorrectly picked or placed item as well as a detection signal of the placement or removal of the selected item 90 from the correct bin 80. It is to be appreciated that via the above mentioned configuration of the controller 65, the DLIM system 10 helps to combat inventory shrinkage at least at the stocking and picking phase by tracking each placement and picking of an item 90 down to the level of each bin 80 at each storage location, such as in cabinet 15.

In still other embodiment, the processor 100 can transmit at regular intervals locally captured data, such as provided in records 225, to a centralized data warehouse 245 and/or to another remotely located (remote) computer 250 that is in communication with the controller 65 of the DLIM system 10 (FIG. 1) via network 110 via the communications interface 105. In still other embodiments, one or more controller 65a, 65b of other DLIM systems at other remote/geographically diverse locations may likewise be in communication with the centralized data warehouse 245 and/or remote computer 250 for monitoring sales and inventory in (near-) real time, thereby providing live tracking of the items contained in each shelf at each remote location over a geographic area/territory. In some embodiments, the network 110 is implemented using a wide area network (WAN) or other networking means such as an intranet or the Internet. As such, the centralized data warehouse 245 and remote computer 250 may include digital systems and other devices permitting connection to and navigation of the network 110 as well as to configure and control operation of each controller 65, 65a and 65b connected to the network 110.

As noted in the above description related to FIGS. 1-4, various electronic components in the DLIM system 10 are in communication with other electronic components, which can be implemented via any medium that is capable of transmitting and/or receiving a data signal with one another such as, for example, via conductive wires, conductive traces, optical waveguides, electromagnetic signals, and the like. As also noted above, the controller 65 includes memory 160 and/or 165 as one or more memory component. One or more of such memory components may be a non-transitory computer readable medium or non-transitory computer readable memory and may be configured as a nonvolatile computer readable medium. One or more of such memory component also may comprise RAM, ROM, flash memories, hard drives, or any device capable of storing machine readable instructions, such as provided by software application 180, such that the machine readable instructions can be accessed and executed by the processor 100. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on such memory components. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In the herein disclosed embodiments, the processor 100 is communicatively coupled to one or more such memory components that stores instructions, such as provided by software application 180, that when executed by the processor 100, cause the processor to perform one or more functions as described herein.

Generally, the software application 180 allows a user, such as a clerk, to view, add and subtract a number of physical items 90 associated with a bin of a shelf 155 virtually shown on a display 30, 110. The software application 180 indicates, by way of causing the processor 100 to illuminate the subset of lights 115 associated with the bin 80 of a selected item 90, e.g., a particular brand of tobacco, from a shelf 20 of similar looking items. The software application 180 indicates, by way of an electronic illustration, i.e., GUI 35, and optionally presented as an interstitial or modal window, the position of a selected item 90 from the associated bin 80 on a display 110, after selection of the same via the user input device 125 or POS device 45, via the visible indicator 200. In further embodiments, the software application 180 indicates, by way of the GUI 35 as an interstitial or modal window, the bin 80 of the selected item 90, after selection on a display of a compatible third party point-of-sale device, such as POS device 45, e.g., being a PC-enabled cash register, with display 30.

In other examples, the software application 180, via the detection signal from the sensor 95, captures and counts incidences of items pulled from (e.g., for the purpose of sale) and inserted into (e.g., for the purpose of restock and replenishment) an associated bin 80. The detection signal may be sent by any conventional shelf pick and place detection device, such as e.g., and not limited thereto, a spring-loaded sensors 95a, time-of-flight sensors 95b, as well as by way of RFID reader(s)/antenna(s) (not shown) situated below or next to each stack of tobacco products. Such a shelf pick and place RFID based detection device is disclosed by U.S. Pat. No. 9,374,139, the disclosure of which is herein incorporated fully by reference.

In other embodiments, the software application 180 provides a utility that displays a cross-selling suggestion(s), i.e., via the alternative information 210, of one or more products if certain criteria such as, e.g., the originally selected product is out of stock or specifically marked for promotion. The software application 180 in another embodiment provides an API to third party point-of-sale integrators to allow for the display of the on-screen product pathfinding on such various systems, such as the POS device 45. Additionally, the software application 180 in another embodiment will provide an API to third party point-of-sale integrators to allow an embedded computing device, such as controller 65, to be queried to obtain dispensing and replenishment balances and other forms of on-site business intelligence.

The software application 180 also in another embodiment transmits at regular intervals locally captured data, such as records 225, to the centralized data warehouse 245 and/or computer 250 for aggregation of data, which may include like data from controllers 65a, 65b of other DLIM system 10 installations, which may be used for business intelligence purposes by parties interested, e.g., in the various deployments of cabinets 15 and shelves 20, individually or together. In still a further embodiment, the software application 180 provides extensions to an internet-based portal to allow for the visualization, e.g., on computer 250 of the business intelligence provided by various installed controllers 65, 65a, and/or 65b.

According to the above mentioned embodiments, the functions performed by one or more of the components/entities of the DLIM system 10, such as all or portions of the controller 65, may be performed by various means, such as hardware and/or firmware, including those described above, alone and/or under control of the software application 180. As such, the software application 180 may be part of a computer program product for performing one or more functions of exemplary embodiments of the present invention. This computer program product may include a computer-readable storage medium, such as the non-volatile storage medium, and software including computer-readable program code portions, such as a series of computer instructions, embodied in the computer-readable storage medium. In this regard, FIGS. 5-6 are flowcharts of apparatuses, methods and program products according to exemplary embodiments of the present invention.

Figure 5:
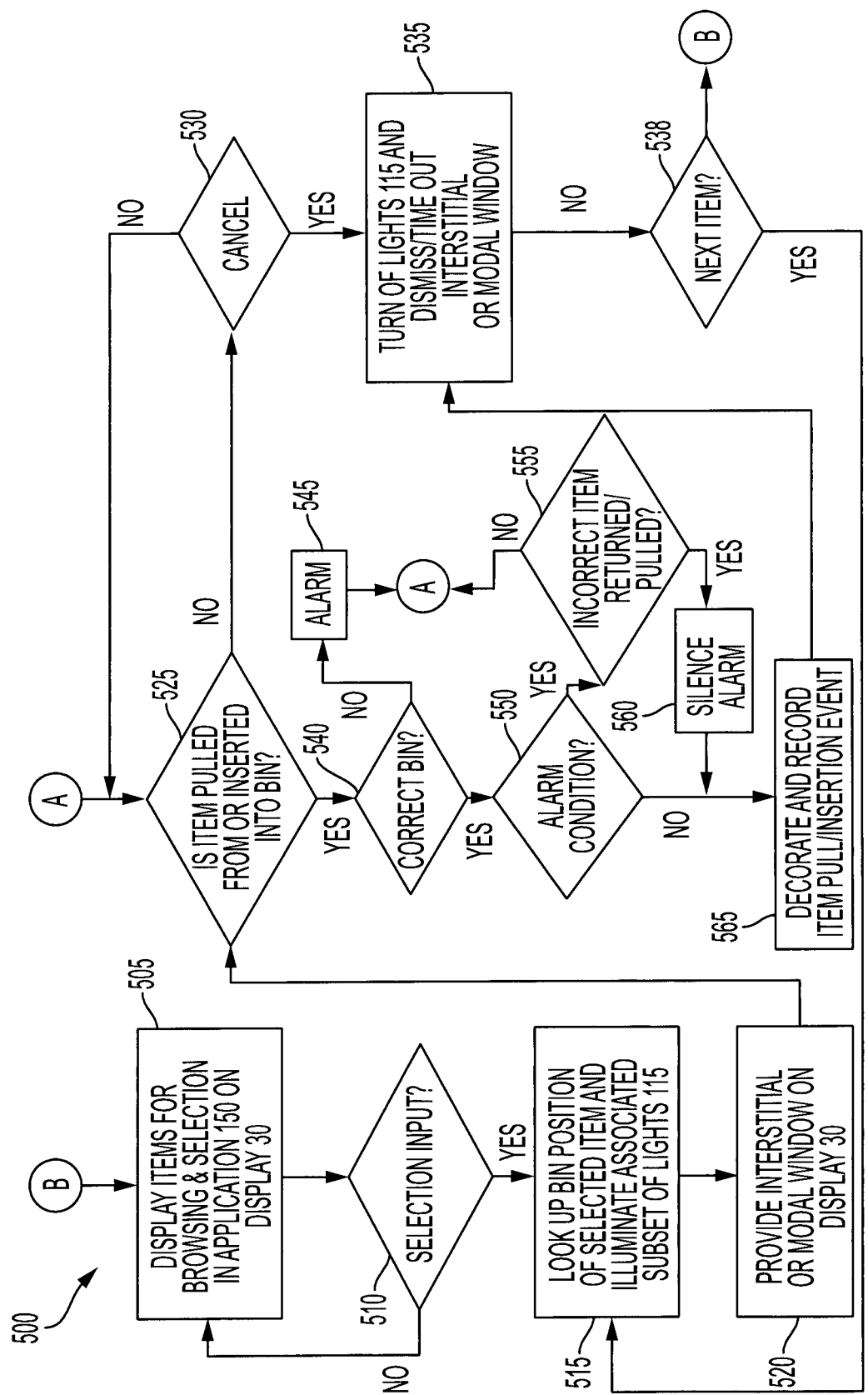
FIG. 5 is a flow chart that depicts machine logical processes/programming of a selection workflow implemented by the DLIM system of FIG. 1 according to an exemplary embodiment.
Figure 6:
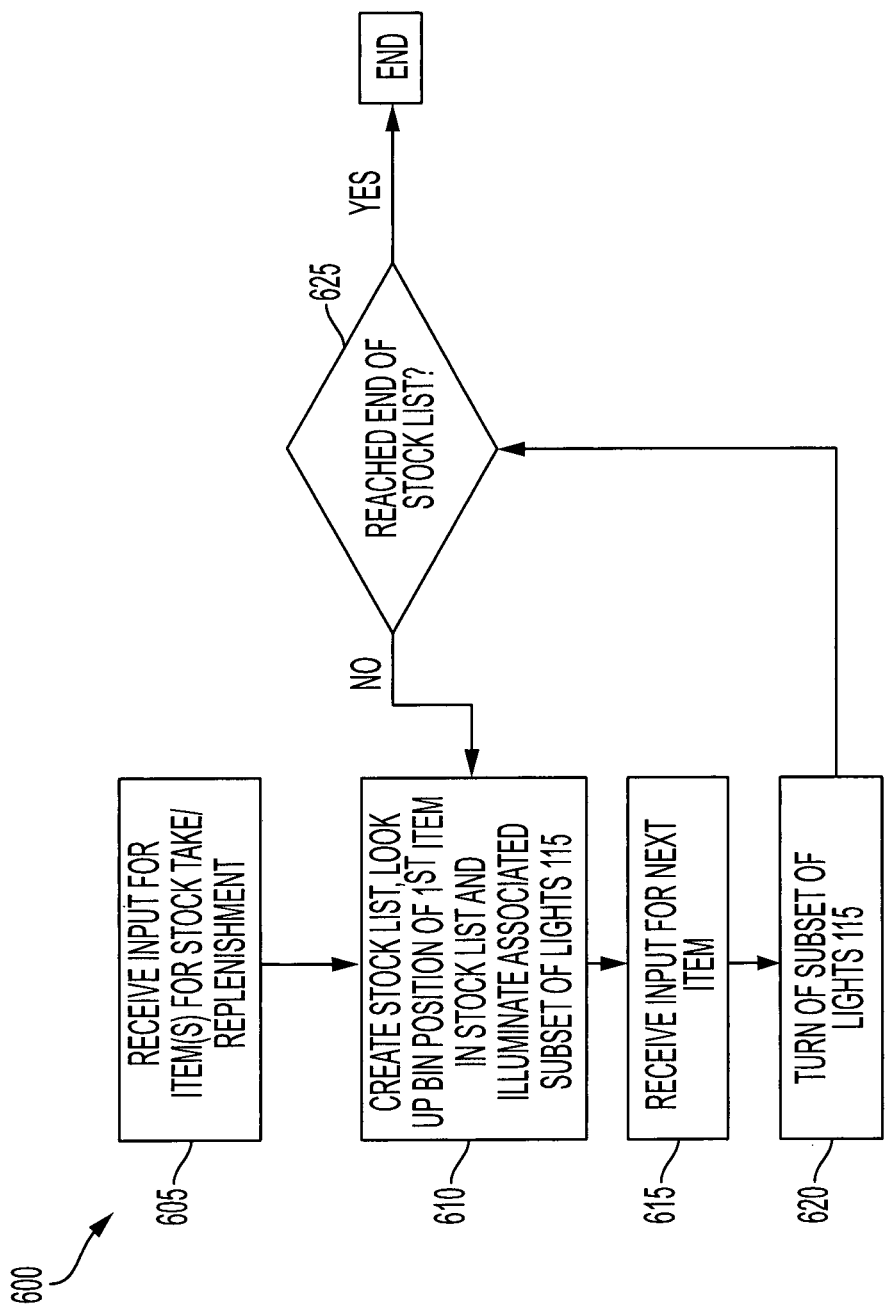
FIG. 6 is a flow chart that depicts machine logical processes/programming of a stock take/replenishment workflow implemented by the DLIM system of FIG. 1 according to an exemplary embodiment.

It will be understood that each step or block of the flowcharts, and combinations of blocks in the flowcharts, depicted by FIGS. 5 and 6 can be implemented by various means, such as hardware, firmware, and/or software including one or more computer program instructions. As will be appreciated, any such computer program instructions may be loaded onto a computer or other programmable apparatus, such as processor 100, to produce a specific machine, such that the instructions which execute on processor, the computer or other programmable apparatus (i.e., hardware) create means for implementing the functions specified in the step(s) or block(s) of the flowcharts. As mentioned, these computer program instructions may also be stored in a computer-readable memory that can direct a computer or other programmable apparatus to function in a particular manner, such that the instructions stored in the computer-readable memory produce an article of manufacture including instruction means which implement the function specified in the step(s) or block(s) of the flowcharts. The computer program instructions may also be loaded onto a computer or other programmable apparatus to cause a series of operational steps to be performed on the computer or other programmable apparatus to produce a computer-implemented process such that the instructions which execute on the processor, computer or other programmable apparatus provide steps for implementing the functions specified in the step(s) or block(s) of the flowcharts.

Accordingly, steps or blocks of the flowcharts depicted by FIGS. 5 and 6 support combinations of means for performing the specified functions, combinations of steps for performing the specified functions and program instruction means for performing the specified functions. It will also be understood that one or more steps or blocks of the flowcharts, and combinations of steps or blocks in the flowcharts, can be implemented by special purpose hardware-based computer systems which perform the specified functions or steps, or combinations of special purpose hardware and computer instructions.

With reference to FIG. 5, depicted is a flowchart of machine logical processes/programming of a selection workflow 500 implemented by the DLIM system of FIG. 1 according to an embodiment thereof. In block 505 of the selection workflow 500, the processor 100 is running/providing on display 30, 110 the software application 180 which permits a user to browse virtually the various items/products contained in the cabinet 15 and select one or more items 90 (different and/or same) therefrom via the user input device 125. After a selection input is received via the user input device 125, which is checked in block 510, the processor 100 will look up the information 140 related to the selected item 90 to determine the associated bin 80 and illuminate the associated subset of lights 115 in block 515.

In block 520 of FIG. 5, the processor 100 then opens an interstitial or modal window on display 30, 110 which highlights the position of the associated bin 80 currently being illuminated by the lit subset of lights 115 via the visible indicator (position indicating icon) 200 (FIGS. 1 and 4). In block 525, the processor 100 then waits for a signal from sensor 95 which will indicate whether a product e.g., item 90, is pulled from or inserted directly into the associated bin 80. While waiting, in block 530, the processor 100 checks to see if the selection has been cancelled via a cancel selection 255 (FIG. 4) provided on the GUI 35 and/or user input device 125 (not shown). If an item selection is cancelled, then the processor 100 turns off the subset of lights 115 and dismisses/permits the timing out the interstitial or modal window in block 535. In block 538, if there is not a next item, then the processor 100 will return to block 505 to wait for an input of a product browsing and/or selecting via the user input device 125. If, however, there is another item that had been selected, then the processor 100 will return to block 515 to look up the information 140 related to the next selected item 90 to determine the associated bin 80 and illuminate the associated subset of lights 115.

Upon receiving the signal from the sensor 95 in block 525, the processor 100 will check in block 540 whether the signal indicating the pulled or placement of an item is from the correctly associated bin 80 for the selected item 90. If not, then the processor 100 will set an alarm condition in block 545 which provides an alarm, e.g., a warning sound from speaker/blue tooth device 120 (FIG. 3) and/or an error message 260 (FIG. 4) provided on display 30, 110, and return to block 525 to wait for a signal from the sensor 95 of return and removal of the incorrect item and/or a pulling and/or placement of the selected item 90. After receiving the above sensor signal(s), and if in block 540 the received signal from the sensor 95 indicants that the detected pull or placement is from the correct bin of the selected item 90, the processor 100 in block 550 will check if an alarm condition has been set. If the alarm condition was previously set, then the processor 100 will check in block 555 to see if a signal was provided via an associated sensor in block 525 as to whether the incorrectly picked or placed item was returned to/removed from the incorrect bin. If not, then the processor 100 continues the alarm/error message display and returns to block 525 for such a signal indicating that the incorrect item has been replaced or removed in order to clear the alarm condition and silence the alarm/error message in block 560.

When not in or no longer in an alarm condition as determined by block 550, the processor 100 will then in block 565 decorate the associated bin 80 with a success condition via flashing, i.e., quickly turning on and off the subset of lights 115 for a short period of time, e.g., less than 5-10 seconds, and record a pulling or insertion event for the selected item in the event record 225 and/or in an associated database record of the POS device 35, data warehouse 245, and/or computer 250. Next, the processor 100 will proceed to block 535 to carry out the processes of turning off the subset of lights 115 and dismiss/time out the interstitial or modal window. The processor 100 continues with the check in block 538, and if no further items have been selected, returns to block 505 to repeat the process upon a new selection input.

Turning now to FIG. 6, depicted is a flowchart of the machine processes of a stock take/replenishment workflow 600 implemented by the DLIM system 10 of FIG. 1 according to an embodiment thereof. In block 605 of the stock take/replenishment workflow 600, upon launching the stock take/replenishment feature of the software application 180, the processor 100 waits for input of a selected item(s) 90 for stock take/replenishment via user input device 125. It is to be appreciated that one or more items 90, including all items in the cabinet 15, may be selected to form a list of items selected, inputted and operated upon by the processor 100. After receiving the input in block 605, the processor 100 in block 610 will illuminate a bin 80 that corresponds to a first one of the selected items(s) 90 via the corresponding subset of lights 115. The user then proceeds to stock take/replenish the illuminated bin 80. While the user is in the process of the stock take/replenishment of the illuminated bin 80, the processor 100 waits to receive a next item input via the user input device 125 in block 615. After receiving the next item input in block 615, the processor in block 620 turns off the lit subset of lights 115, and then in block 625 checks whether there is another item, e.g. in the list of items selected in block 605. If there is another item, then the processor proceeds back to block 610 and illuminates the next bin 80 via the associated subset of lights 115 for the next item that is to be processed by the stock take/replenishing steps. If in block 625 there is not a next item, then the processor 100 will end the stock take/replenishment workflow 600.

By the above disclosure, a method for dispensing items from the DLIM system 10 is realized. The DLIM system 10 in an embodiment comprises a shelf 20 having a plurality of dividers 85 which divide the shelf 20 into a plurality of bins 80 for holding visibly indistinguishable items 90. A sensor 95 associated with each one of the plurality of bins 80 to detect placement or removal of one or more of the items 90 from the associated bin. A processor 100, having a memory 160, 165 which stores an item list 170 indicating which items 90 are held within each of the bins 80 and being in communication with the sensor 95, receives a detection signal which indicates the placement or removal of one or more items from the associated bin. An entry device 130 in communication with the processor 100, sends entered requests for placement or removal of the one or more items 90 to the processor. An indicator strip 25 attached to the shelf 20 has a set of lights 30 linearly arranged in an single dimension such that an associated subset of lights 115 thereof comprising two or more lights uniquely identifies one of the bins 80 when lit. The indicator strip 25 is in communication with the processor 100 and wherein the processor further includes information 140 relating to which bin 80 each subset of lights 115 is associated, and wherein selection of at least one of the items 90 from the item list 170 via the entry device 130 causes the processor 100 to send a signal to actuate the subset of lights 115 that is associated with the bin 80 with the one or more items selected. The processor 100 records in memory 160, 165 a type of action 230 being selected from a placement and a removal, a timestamp 235 and a quantity 240 of the one or more items selected placed or removed from the associated bin 80 having the subset of lights 115 lit and indicated in the detection signal subsequently received from the sensor 95 of the associated bin 80.

With the above noted DLIM system embodiment in mind, one or more methods have been disclosed. For example, in an embodiment, the method may comprise storing in memory 160, 165 an item list 170 of the items 90 which are held within each of the bins 80, and information 140 relating to which bin 80 each subset of lights 115 of the strip 25 is associated with each item 90. Such methods may further comprise one or more of the following steps of: receiving via the processor 100 entered requests for placement or removal of one or more selected items 90 sent from the entry device 130 to the processor; sending via the processor 100 a signal to actuate the subset of lights 115 which is associated with the bin 80 with the one or more selected items 90; and recording in memory 160, 165 the type of action 230 selected from a placement and a removal, the timestamp 235 and the quantity 240 of the one or more selected items 90 placed or removed from the associated bin having the subset of the set of lights light and indicated in a detection signal subsequently received from the sensor of the associated bin.

In still other embodiments, one or more methods may include also recording in memory 160, 165, the product identification 190. In other embodiments, one or more methods may comprise: entering employee identification 185, and verifying the entered employee identification is as an authorized employee before permitting the processor 100 to accept a selection of the one or more items 90. In other embodiments, the method may comprise sending, via the processor 100, a signal to unlock a lock 60 of a cabinet 15 containing the one or more items 90 selected, and in which in other embodiments entered employee identification 185 is first verified by the processor 100 as an authorized employee before permitting the processor to accept a selection of the one or more items and/or send the signal to unlock the cabinet containing the one or more items selected.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Many modifications and other embodiments of the inventions will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-based dispensing and live inventory management system, comprising:
    a shelf having a plurality of dividers which divide the shelf into a plurality of bins for holding visibly indistinguishable items;
    a controller signally cooperative with the shelf and comprising:
        a sensor signally cooperative with each one of the plurality of bins to detect placement or removal of one or more of the items from an associated one of the plurality of bins;
        a processor having a memory which stores a list of the items which are held within each of the bins, the processor being in signal communication with the sensor to receive a detection signal therefrom which indicates the placement or removal of the one or more of the items from the associated bin; and
        an entry device in signal communication with the processor which sends entered requests for the placement or removal of the one or more items to the processor; and
    an indicator strip attached to the shelf, wherein the indicator strip has a set of lights linearly arranged in a single dimension such that an associated subset of the set of lights comprising two or more lights uniquely identifies one of the bins when lit, wherein the indicator strip is in signal communication with the processor and wherein the processor further includes information relating to which bin each subset of the set of lights of the indicator strip is associated, and wherein selection of at least one of the items from the list via the entry device causes the processor to determine the associated bin and send a signal to actuate the subset of the set of the plurality of lights that correspond to the associated bin, and to record in memory a type of action being selected from a placement and a removal, a timestamp and a quantity of the one or more items selected, placed or removed from the associated bin having the subset of the set of lights light and indicated in the detection signal subsequently received from the sensor of the associated bin.

2. The system of claim 1, wherein the dividers are adjustable to adjust the spacing there-between and in which the information relating to which bin each subset of the set of lights of the strip is associated is set by entering a positional numbering of each light located in the strip for the subset of the set of lights.

3. The system of claim 2, wherein the information relating to which bin each subset of the set of lights of the strip is associated is set and entered by movement and placement of a graphical icon for each divider on a display depicting the shelf and the strip.

4. The system of claim 1, wherein the lights comprise LEDs, and the sensor detects each incidence of the selected item picked or placed from the associated bin via a change in electrical resistance of a spring-loaded sensor travelling on a carbon rheostat track situated below or next to each bin of the shelf or the sensor detects each incidence of the selected item picked or placed from the associated bin via a difference of measurement in a time-of-flight of a transmission and detection of a beam of light from a micro-laser and collector sensor, situated at a back of each bin.

5. The system of claim 1, further comprising a cabinet which contains the shelf, and the cabinet optionally has a lock to prevent access to the shelf when locked, and the shelf is optionally retractable.

6. The system of claim 5, wherein the lock is provided and stays locked until receiving a signal from the processor.

7. The system of claim 1, wherein the process provides an error signal upon the detection signal not being from the associated bin of the one or more selected items.

8. The system of claim 1, further comprising a display which graphically indicates position of the one or more item selected within the shelf via a graphical reproduction of the shelf and strip provided on the display which visibly indicates the associated subset of lights on the display of the bin containing the one or more selected items.

9. The system of claim 8, wherein after selection, branding information of the one or more items is displayed by the processor on a display.

10. The system of claim 8, wherein the graphical reproduction of the shelf and strip is provided via an interstitial, a pop-up window, a modal or an overlay on the display, wherein the display is a touch screen display or a POS device.

11. The system of claim 1, wherein the entry device is a touch screen device and/or a POS device, and the processor activates the subset of lights after selection on the one or more item via the touch screen and graphically indicates position of the one or more item selected within the shelf via a graphical reproduction of the subset of light associated with the bin of the shelf shown lit on the touch screen device and/or a POS device.

12. The system of claim 1, wherein the processor displays on a display various products if the one or more item selected is out of stock or specifically marked for a promotion.

13. The system of claim 1, wherein the processor provides an interstitial of a graphical indication of position of the one or more item selected within the shelf via a graphical reproduction of the subset of light associated with the bin of the shelf shown lit via an Application Programming Interface (API) to a remote application, wherein the remote application is optionally a point-of-sale application.

14. The system of claim 1, wherein the processor provides dispensing and replenishment balances in response to queries received via an Application Programming Interface (API) from a remote application, wherein the remote application is optionally a point-of-sale application.

15. The system of claim 1, wherein the processor transmits at regular intervals locally captured data to a centralized data warehouse.

16. A method for dispensing items from a computer-based dispensing and live inventory management system that comprises a shelf having a plurality of dividers which divide the shelf into a plurality of bins for holding visibly indistinguishable items, a controller signally cooperative with the shelf, the controller comprising a sensor signally cooperative with each one of the plurality of bins to detect placement or removal of one or more of the items from an associated one of the bins, a processor having a memory which stores a list of items which are held within each of the bins and being in signal communication with the sensor to receive a detection signal therefrom which indicates the placement or removal of one or more items from the associated bin, an entry device in signal communication with the processor which sends entered requests for placement or removal of the one or more items to the processor, and an indicator strip attached to the shelf, wherein the indicator strip has a set of lights linearly arranged in an single dimension such that an associated subset of the set of lights comprising two or more lights uniquely identifies one of the bins when lit, wherein the indicator strip is in signal communication with the processor and wherein the processor further includes information relating to which bin each subset of the set of lights of the strip is associated, and wherein selection of at least one of the items from the list of items via the entry device causes the processor to determine the associated bin and send a signal to actuate the subset of the set of the plurality of lights that correspond to the associated bin, and to record in memory a type of action being selected from a placement and a removal, a timestamp and a quantity of the one or more items selected, placed or removed from the associated bin having the subset of the set of lights light and indicated in the detection signal subsequently received from the sensor of the associated bin, said method comprising:
  storing in memory:
    a list of items which are held within each of the bins, and
    information relating to which bin each subset of the set of lights of the strip is associated with each item;
  receiving via the processor entered requests for placement or removal of one or more selected items sent from the entry device to the processor;
  sending via the processor a signal to actuate the subset of the set of the plurality of lights which is associated with the bin with the one or more selected items; and
  recording in memory the type of action selected from a placement and a removal, the timestamp and the quantity of the one or more selected items placed or removed from the associated bin having the subset of the set of lights light and indicated in a detection signal subsequently received from the sensor of the associated bin.

17. The method of claim 16 further comprising:
  adjusting at least some of the dividers in the drawer to form a preferred arrangement of the bins; and
  entering via the entry device as part of the information stored in memory:
    the associated subset of the set of lights comprising two or more lights which uniquely identify one of the bins when lit in the preferred arrangement, and
    type of item associated with the associated subset of the set of lights in the preferred arrangement.

18. The method of claim 16, further comprising entering employee identification information via the entry unit, and verifying the entered employee identification information as an authorized employee before permitting the processor to accept a selection of the one or more items.

19. The method of claim 16 further comprising sending, via the processor, a signal to unlock the cabinet containing the one or more items selected.

20. The method of claim 19, further comprising entering employee identification information via the entry unit, and verifying the entered employee identification information as an authorized employee before permitting the processor to accept a selection of the one or more items or send the signal to unlock the cabinet containing the one or more items selected.

* * * * *